United States Patent [19]
Jansson

[11] 3,894,328
[45] July 15, 1975

[54] METHOD OF LINING PIPES
[75] Inventor: Lennart Erik Elof Jansson, Alvsjo, Sweden
[73] Assignee: Stabilator AB, Bromma, Sweden
[22] Filed: Sept. 4, 1973
[21] Appl. No.: 394,000

[30] Foreign Application Priority Data
Sept. 7, 1972   Sweden.......................... 11555/72

[52] U.S. Cl.................................... 29/451; 29/235
[51] Int. Cl............................................ B23p 11/02
[58] Field of Search ............. 29/451, 235, 421, 523

[56] References Cited
UNITED STATES PATENTS
| 489,950 | 1/1893 | Harrington............................ 29/523 |
| 714,903 | 12/1902 | Hinds................................... 29/451 |
| 1,074,505 | 9/1913 | Kempshall...................... 29/523 UX |
| 2,977,994 | 4/1961 | Xenis............................ 29/451 UX |

FOREIGN PATENTS OR APPLICATIONS
| 343,357 | 3/1972 | Sweden................................ 29/451 |

Primary Examiner—Charlie T. Moon
Attorney, Agent, or Firm—Anthony A. O'Brien

[57]       ABSTRACT

A method of lining pipes, in which a flexible tube or hose having a surface diameter corresponding to the inner diameter of the pipe is radially contracted before being placed in the pipe, the tube being held in the contracted state by wires or bands of mainly nonmetallic material which are arranged around the periphery of the tube, said wires or bands, after the tube has been inserted into the pipe, being cut off or pulled off in order to release their hold on the tube.

5 Claims, 1 Drawing Figure

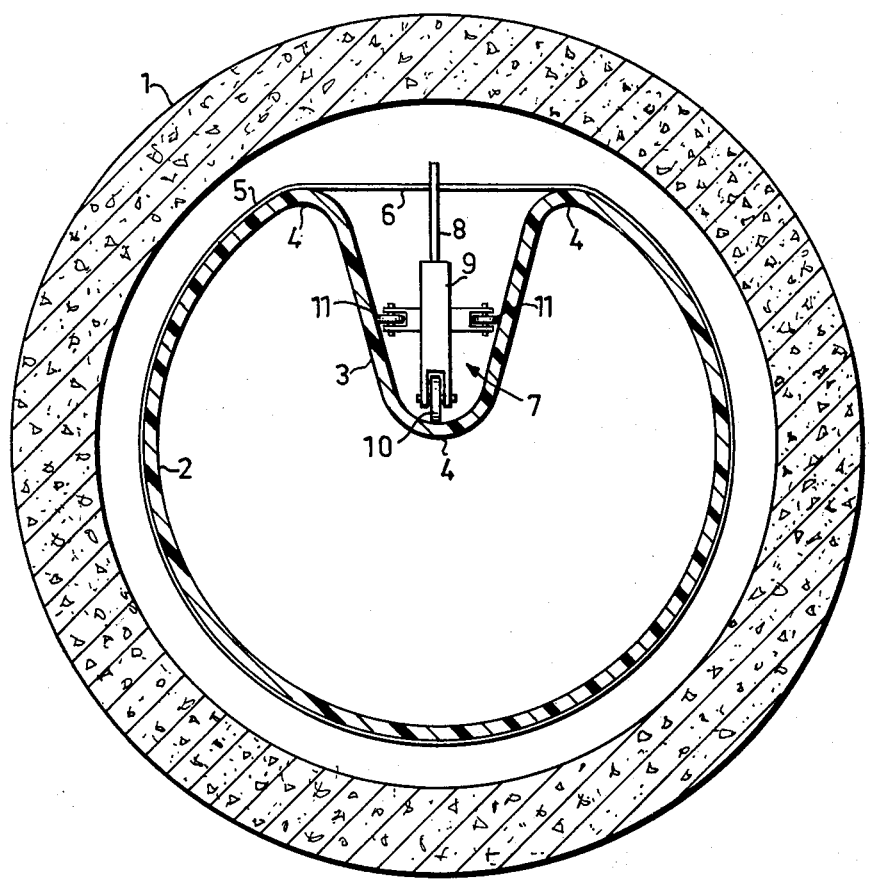

METHOD OF LINING PIPES

The present invention relates to a method of lining pipes, for example pipes made of concrete or the like and which have been layed in the ground, in which a flexible tube or hose having a surface diameter corresponding to the inner diameter of the pipe to be lined is placed in said pipe, said flexible tube being radially contracted before being placed in the pipe so that the greatest width of the tube is less than the inner diameter of the pipe and at least one inwardly folded section of the tube exists which forms a groove in the body surface of the tube and extends axially along the tube.

It is previously known, for example by Swedish lay-open print No. 343 357, to line pipes by this method. In the cited lay-open print, the flexible tube is held in a contracted state by a plurality of steel bands which have been arranged around the periphery of the tube, said steel bands being provided with releasable locking means. By releasing all the locking means simultaneously, the bands release their hold on the tube so that the tube can return to its original shape. The release is obtained with the help of a wire which has been provided with a drawing force, said wire being connected to all of the locking means.

However, the use of steel bands to contract the flexible tube entails a significant disadvantage. Outside of the fact that the construction is expensive, it also uses up more space as the locking means uses up a certain radial space which results in that after release, the flexible tube does not lie against the inner wall of the pipe in the space taken up by the locking means. Problems also arise when the flexible tube is led into the pipe due to friction between the steel bands and especially the locking means and the often rough and uneven inner wall of the pipe. It has also been found to be difficult to release the locking means without first having arranged a dolly, which calls for a drawing force being provided in both directions, that is, opposing drawing forces must be provided on both of the band sections which form the locking means.

The purpose of the present invention is to provide a method which eliminates the disadvantages described above. This is obtained according to the invention by the tube being held in a contracted state by wires, bands or the like which are composed of mainly non-metallic material, said bands or wires etc. being spaced along the length of the tube and arranged on the periphery of said tube. After the flexible tube has been led into the pipe, the wires or bands etc. are cut or pulled off so that they release their hold on the flexible tube. The bands can, preferably, be adhesive and composed of a plastic material. These are very easy to mount and can be formed very thin while maintaining the necessary strength. The friction between the contracted flexible tube and the pipe is significantly reduced during the insertion of the flexible tube.

According to a preferred embodiment, the wires or bands are cut by a knife arrangement which, using the groove for guiding purposes, is moved from one end of the flexible tube to the other.

The method according to the invention is described in more detail with reference to the enclosed drawing in which the FIGURE shows a cross section of a concrete pipe having a flexible tube inserted in a contracted state.

In the FIGURE, the pipe which is to be lined is referred to as 1. A flexible tube 2, preferably of a plastic material or another suitable material, for example nylon, rubber or the like, is inserted in the pipe 1. The plastic tube 2 is shown in the contracted state, that is it is folded so that a groove 3, running in the axial direction of the tube 2 and having a U-shaped cross section, is formed in the body surface of the tube 2. In this manner a reduction of the diameter of the flexible tube 2 is obtained in relation to the original diameter of said flexible tube 2 and against the corresponding inner diameter of the pipe 1 so that the plastic tube 2 can be easily inserted in the pipe, even in longer lengths. In order to facilitate the contraction of the plastic tube 2, it is possible to form said tube with somewhat thinner wall thicknesses in those sections 4 which are folded during contraction and forming of the U-shaped section 3.

The plastic tube 2 is held in a contracted state with the help of a plurality of continuous jointless-type wires or bands etc. 5 of a suitable material and which are evenly spaced along the length of the flexible tube 2. The bands or wires etc. 5 are of the necessary strength and can be cut off by a knife arrangement or be pulled off. Adhesive bands 5 of a plastic material are preferably used, which can be easily mounted on the flexible tube 2 without special measures being necessary for connecting the ends of the bands with each other. The mounting of the bands can, by a simple method, take place by the plastic tube 2 being pressed through an opening having a diameter corresponding to the diameter of the tube 2 in a contracted state, whereby the bands 5 are successively fastened around the tube as it passes through the opening.

The bands 5 shall be brought to release their hold on the tube 2 after the tube 2 has been inserted into the pipe 1 so that the plastic tube can expand to its original form and lie against the inner wall of the pipe 1. In order to achieve this, the bands 5 are cut off in the space 6 which lies in the middle of the groove 3 by a knife arrangement 7 which is moved in the groove from one end of the tube 2 to the opposite end of said tube.

The knife arrangement 7, the construction of which can vary within wide limits, shows in the greatly simplified embodiment shown in the FIGURE, a vertical knife blade 8 which extends above the band section 6. The band 8 is fastened to a support arrangement 9 having small vertical wheels or discs 10 and horizontal wheels or discs 11 which are supported against the bottom and side walls, respectively, of the groove 3 which functions as steering means during the advancement of the knife arrangement 7 in the groove 3. In order to further secure the steering of the knife arrangement 7, support members which are not shown in the drawing can be arranged to be supported against the bottom side and top side, respectively, of the band section 6, eventually in the form of horizontal support surfaces which are arranged directly on the knife arrangement 7. Another possibility is to arrange a member which is directly supported against the pipe 1 above the band section 6.

Instead of a conventional knife blade 8, a heating wire which is heated by electricity can be used.

The advancement of the knife arrangement 7 is accomplished by, for example, a wire or the like connected to said knife arrangement, said wire extending along the entire length of the groove 3. When the bands 5 are to be cut off, the knife arrangement 7 is placed at one end of the groove 3 after which, by means of the wire, it is pulled over to the other end during which it successively cuts off the bands 5.

The method according to the invention has been described above with reference to an embodiment in which a knife arrangement 7 cuts off the bands or wires etc. 5. The bands can, within the framework of the invention, also be pulled off by the groove 3 or the flexible tube 2 being caused to expand so that the bands 5 are subjected to a drawing force which is sufficiently great for the bands to break.

For this purpose, a body can be used which has such a form and cross section that the groove 3 is forced to expand when the body is advanced through the groove 3 from one end of the tube 2 to the opposing end. The body can, preferably, have the shape of a cone which is inserted into the tube with its pointed end first. The largest cross section of the cone shall be larger than the cross section of the groove 3. In a corresponding manner, the cone can be advanced through the tube 2 itself so that the tube 2 expands. This body can also be conical, whereby the largest cross section of the cone is greater than the greatest width of the tube when the tube 2 is in a contracted state.

According to the invention, the tube can also be caused to expand by both of the open ends of the tube 2 being sealed air-tight, after which the inside of the tube 2 is subjected to pressure by connection to a source of compressed air.

I claim:

1. A method of internally lining a pipe laid in the ground and having an annular interior surface surrounding a hollow pipe interior, a tubular liner of resiliently contractible material including an outer annular surface between its ends, the outer annular surface of the liner having an outside diameter substantially corresponding to the inside diameter of the interior surface of said pipe, said method comprising the steps of contracting the tubular liner from its normal tubular size to a contracted condition having a diameter substantially less than the inside diameter of said pipe, the contracted liner having a radially inwardly extending V-shaped section interposed between and connected to an outer circumferential section of the contracted liner;

emplacing a plurality of continuous jointless-type flexible circumferential bands about and in engagement with outer surface portions of the circumferential section of the contracted liner, the plurality of emplaced bands being in axially spaced relation to each other along the length of the contracted liner so as to hold the contracted liner in the contracted condition, each one of the plurality of emplaced bands being of substantially uniform thickness about its circumference and of relatively thin construction so as to provide a minimal raised edge above and about the outer surface portions of the circumferential section of the contracted liner;

inserting the contracted liner together with the plurality of emplaced bands into the hollow pipe interior at one end of said pipe without the contracted liner and the plurality of emplaced bands becoming frictionally bound against the interior surface of said pipe prior to the expansion of the contracted liner; and severing by using knife means moveable longitudinally of the liner the plurality of emplaced bands from about the contracted liner inserted in the hollow pipe interior so as to effect expansion of the liner until the outer surface of the liner is disposed in engagement about and along the interior surface of said pipe between its ends.

2. The method according to claim 1 wherein the top of the V-shaped section has opposed and spaced ends adjacent to opposed and spaced ends of the circumferential section; certain portions of each one of the plurality of emplaced bands being disposed across and extending chordally between the ends of the V-shaped section so as to enhance the clearance between the ends of the V-shaped section and the interior surface of said pipe upon the contracted liner together with the plurality of bands emplaced thereabout being inserted into the hollow pipe interior.

3. The method according to claim 1 wherein the step of severing the plurality of emplaced bands is effected by said knife means including a knife device travelling relative to the V-shaped section of the liner and into engagement with each one of the plurality of emplaced bands.

4. The method according to claim 1 wherein the step of severing the plurality of emplaced bands is effected by said knife means including a heated wire.

5. The method according to claim 1 wherein the step of severing the plurality of emplaced bands includes the additional steps of closing and sealing off opposed ends of the contracted liner inserted in the hollow pipe interior and the further step of introducing fluid under pressure between the sealed and closed off ends of the contracted liner so as to effect expansion of the liner until the outer surface of the liner is disposed in engagement about and along the interior surface of said pipe.

* * * * *